United States Patent
Lee et al.

(10) Patent No.: US 12,003,983 B2
(45) Date of Patent: Jun. 4, 2024

(54) ACTIVATION OF SECONDARY CELL GROUP CONFIGURATION UPON MASTER CELL GROUP FAILURE DETECTION

(71) Applicant: LG ELECTRONICS INC., Seoul (KR)

(72) Inventors: Youngdae Lee, Seoul (KR); Sunghoon Jung, Seoul (KR); Taehun Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 334 days.

(21) Appl. No.: 17/593,237

(22) PCT Filed: Mar. 27, 2020

(86) PCT No.: PCT/KR2020/004163
§ 371 (c)(1),
(2) Date: Sep. 13, 2021

(87) PCT Pub. No.: WO2020/197306
PCT Pub. Date: Oct. 1, 2020

(65) Prior Publication Data
US 2022/0159483 A1 May 19, 2022

Related U.S. Application Data

(60) Provisional application No. 62/825,775, filed on Mar. 28, 2019, provisional application No. 62/825,731, (Continued)

(51) Int. Cl.
H04W 74/0833 (2024.01)
H04L 5/00 (2006.01)
H04W 24/04 (2009.01)

(52) U.S. Cl.
CPC .......... *H04W 24/04* (2013.01); *H04L 5/0032* (2013.01); *H04W 74/0833* (2013.01)

(58) Field of Classification Search
CPC . H04W 24/04; H04W 74/08; H04W 74/0833; H04L 5/0032
See application file for complete search history.

(56) References Cited

U.S. PATENT DOCUMENTS 9,042,315 B2   5/2015   Lin et al.
9,504,052 B2   11/2016  Wu
(Continued)

FOREIGN PATENT DOCUMENTS

WO   2017196095   11/2017

OTHER PUBLICATIONS

CATT, "Dormant state of SCG," 3GPP TSG-RAN WG2 Meeting #105, R2-1900208, Feb. 25-Mar. 1, 2019, 4 pages (Year: 2019).*
(Continued)

*Primary Examiner* — Jinsong Hu
*Assistant Examiner* — Farideh Madani
(74) *Attorney, Agent, or Firm* — LEE, HONG, DEGERMAN, KANG & WAIMEY

(57) ABSTRACT

A method and apparatus for activation of secondary cell group (SCG) configuration upon master cell group (MCG) failure detection in a wireless communication system is provided. A wireless device delays activation of a SCG. When the wireless device detects a failure on a master cell group (MCG) while delaying the activation of the SCG, the wireless device activates the SCG, and performs a random access procedure on a cell of the SCG.

13 Claims, 22 Drawing Sheets

Related U.S. Application Data filed on Mar. 28, 2019, provisional application No. 62/825,736, filed on Mar. 28, 2019.

(56) References Cited

U.S. PATENT DOCUMENTS

| | | | | |
|---|---|---|---|---|
| 2012/0207070 | A1* | 8/2012 | Xu | H04W 48/20 |
| | | | | 370/311 |
| 2015/0327107 | A1 | 11/2015 | Kim et al. | |
| 2022/0007214 | A1* | 1/2022 | Zhang | H04W 24/10 |

OTHER PUBLICATIONS

3rd Generation Partnership Project (3GPP), "Technical Specification Group Radio Access Network; NR; Radio Resource Control ( RRC) protocol specification (Release 15)," 3GPP TS 38.331 V15. 4.0, Dec. 2018, 474 pages (Year: 2018).*
PCT International Application No. PCT/KR2020/004163 International Search Report dated Jul. 6, 2020, 2 pages.
CATT, "Dormant state of SCG," 3GPP TSG-RAN WG2 Meeting #105, R2-1900208, Feb.-Mar. 2019, 4 pages.
3rd Generation Partnership Project (3GPP), "Technical Specification Group Radio Access Network; Evolved Universal Terrestrial Radio Access (E-UTRA) and NR; Multi-connectivity; Stage 2 (Release 15)," 3GPP TS 37.340 V15.4.0, Dec. 2018, 39 pages.
Brd Generation Partnership Project (3GPP), "Technical Specification Group Radio Access Network; NR; Radio Resource Control (RRC) protocol specification (Release 15)," 3GPP TS 38.331 V15. 4.0, Dec. 2018, 39 pages.

* cited by examiner

ACTIVATION OF SECONDARY CELL GROUP CONFIGURATION UPON MASTER CELL GROUP FAILURE DETECTION

CROSS-REFERENCE TO RELATED APPLICATIONS

This application is the National Stage filing under 35 U.S.C. 371 of International Application No. PCT/KR2020/004163, filed on Mar. 27, 2020, which claims the benefit of U.S. Provisional Patent Application Nos. 62/825,775, 62/825,731 and 62/825,736, all filed on Mar. 28, 2019, the contents of which are all incorporated by reference herein in their entirety.

TECHNICAL FIELD

The present disclosure relates to activation of secondary cell group (SCG) configuration upon master cell group (MCG) failure detection.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Dual connectivity (DC) was introduced in 3GPP to allow a user equipment (UE) to simultaneously transmit and receive data on multiple component carriers from two cell groups one providing E-UTRA access (4G) and the other one providing NR access (5G). One scheduler is located in the master node and the other in the secondary node. The master node and secondary node are connected via a network interface and at least the master node is connected to the core network.

SUMMARY

In NR, upon failure of link on the master node, it has been discussed to introduce reporting of failure indication for link failure on the master node via the secondary node. This is for fast recovery. The failure indication may be destined to the master node via the secondary node. However, resources on the secondary node could not be used/needed for all user equipments (UEs).

In an aspect, a method for a wireless device in a wireless communication system is provided. The method includes delaying activation of a secondary cell group (SCG), upon detecting a failure on a master cell group (MCG) while delaying the activation of the SCG: activating the SCG, and performing a random access procedure on a cell of the SCG.

In another aspect, an apparatus for implementing the above method is provided.

The present disclosure can have various advantageous effects.

For example, a UE can perform fast recovery from RRC connection failure by using suspended SCG link, in particular when the UE does not need SCG resources for user data and/or when the UE does not support full DC capability such as 2TX RF.

For example, the system can provide fast recovery from RRC connection failure for a UE suspending SCG link.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
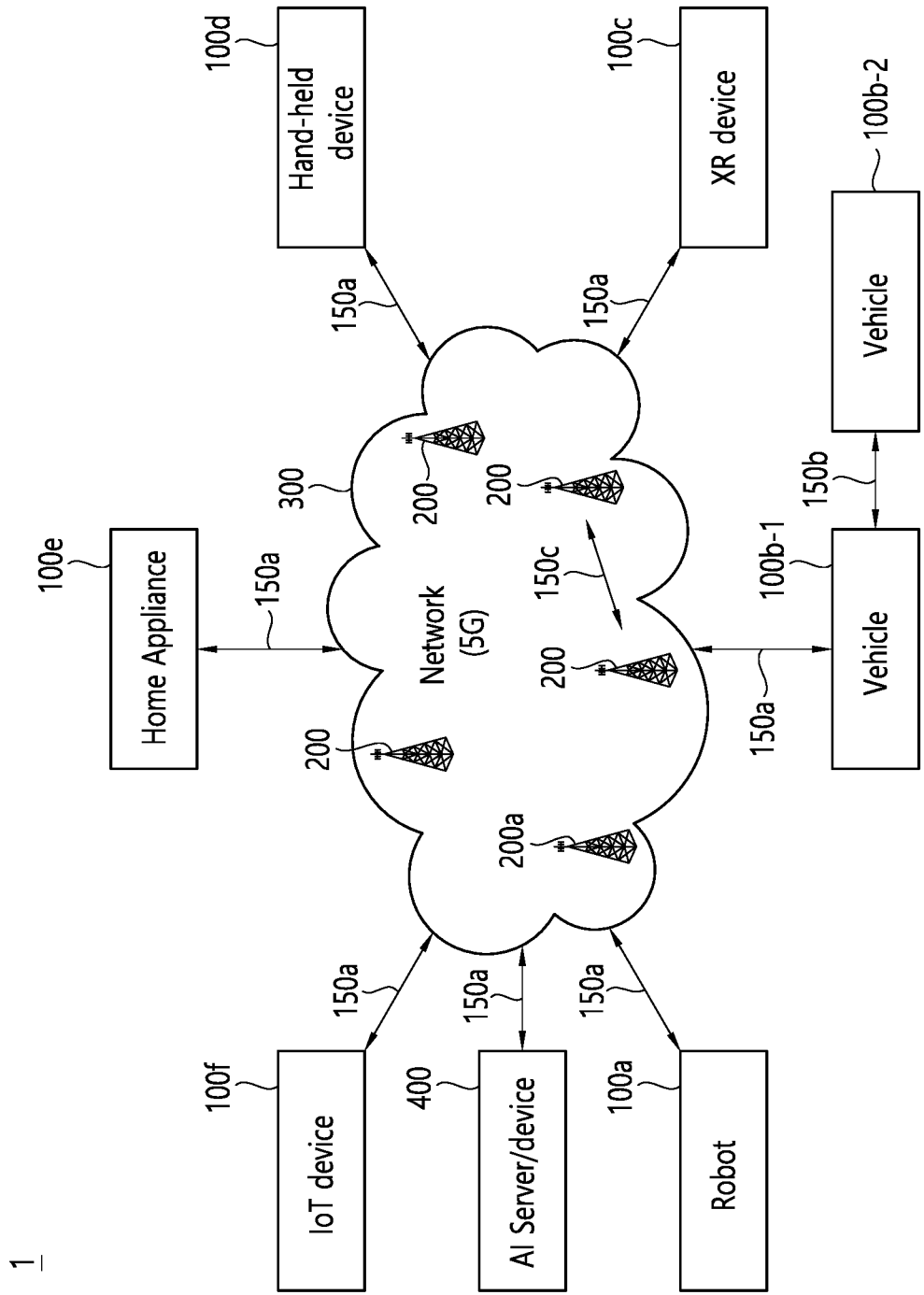
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Figure 2:
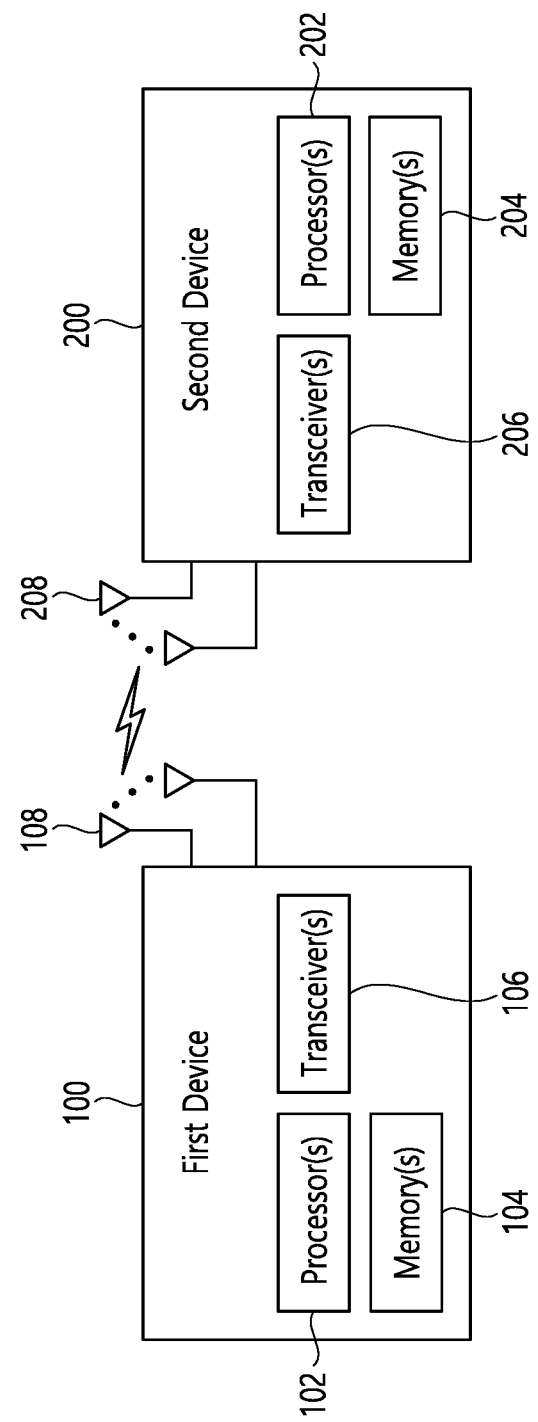
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
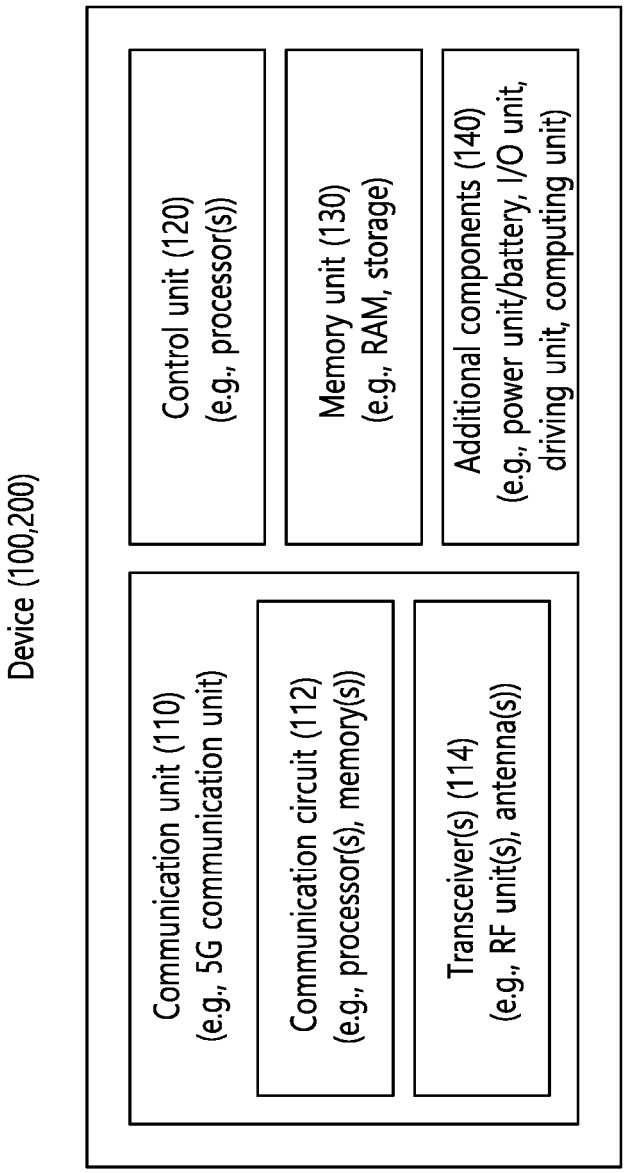
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
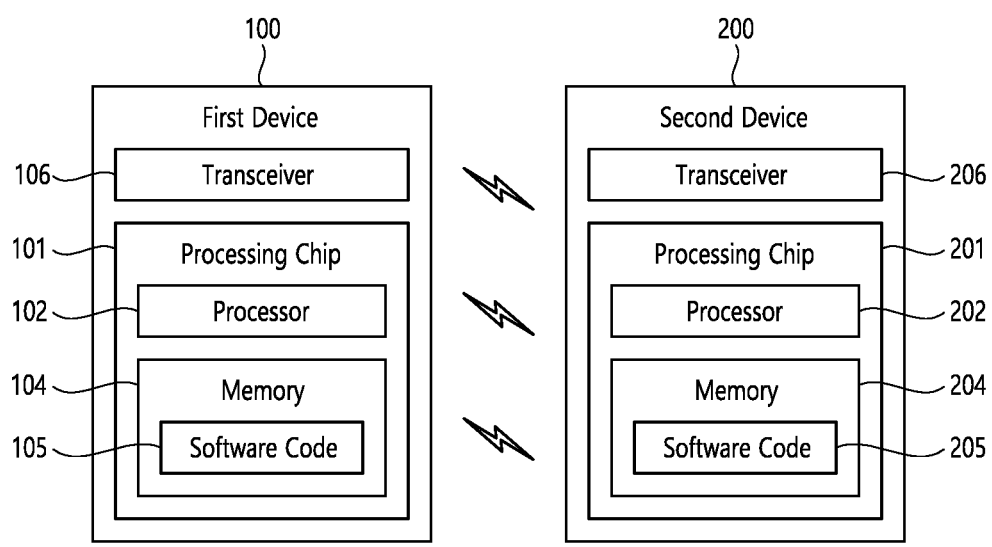
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
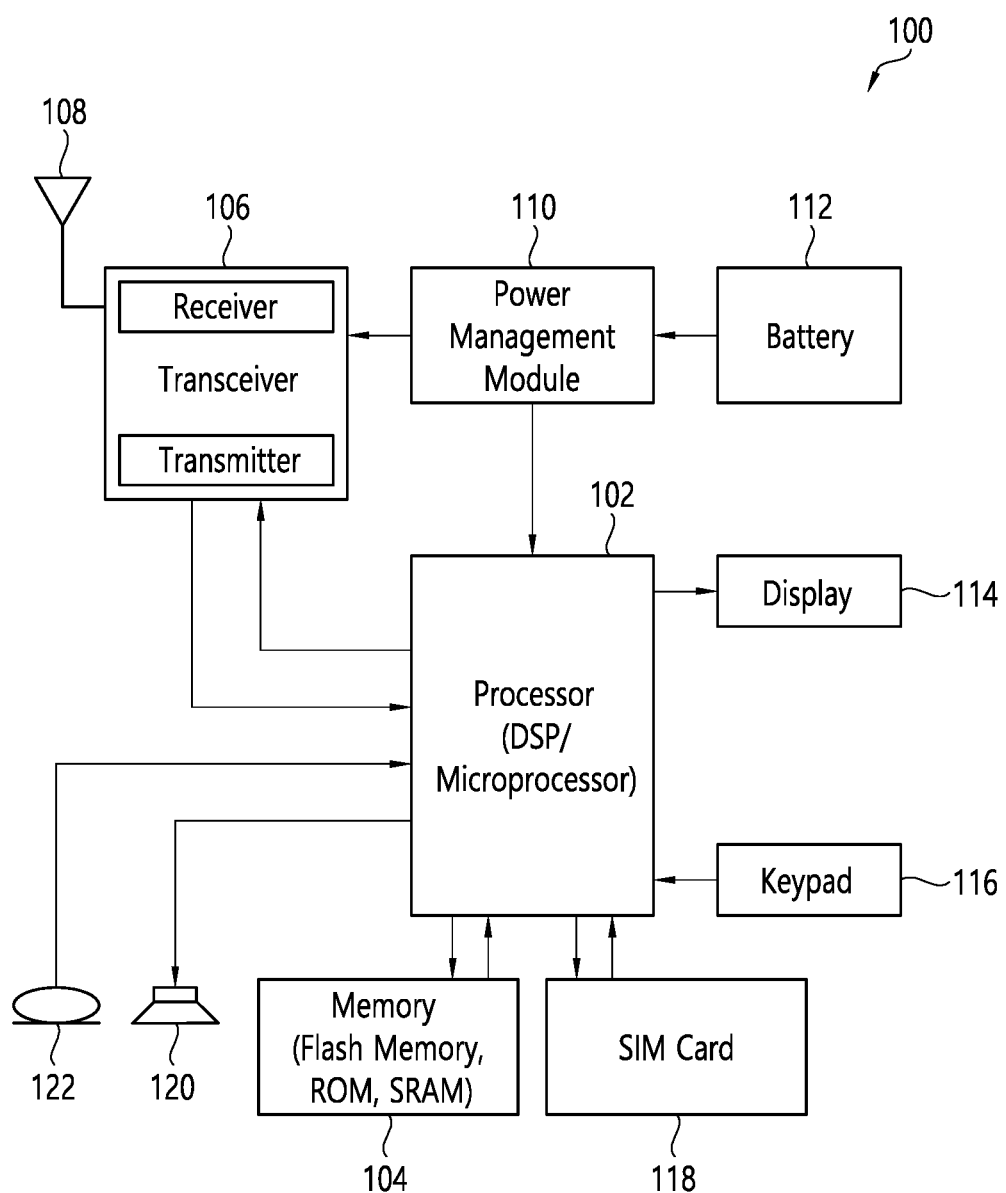
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
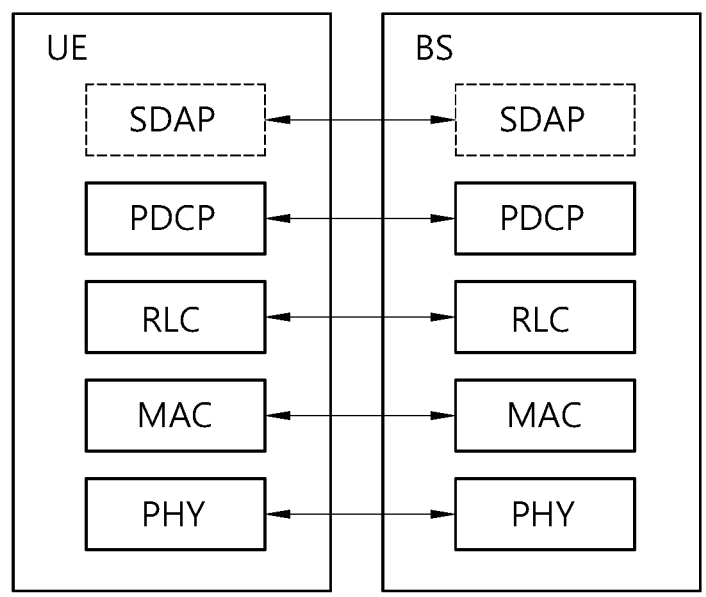
FIGS. 6 and 7 show an example of protocol stacks in a 3GPP based wireless communication system to which implementations of the present disclosure is applied.
Figure 7:
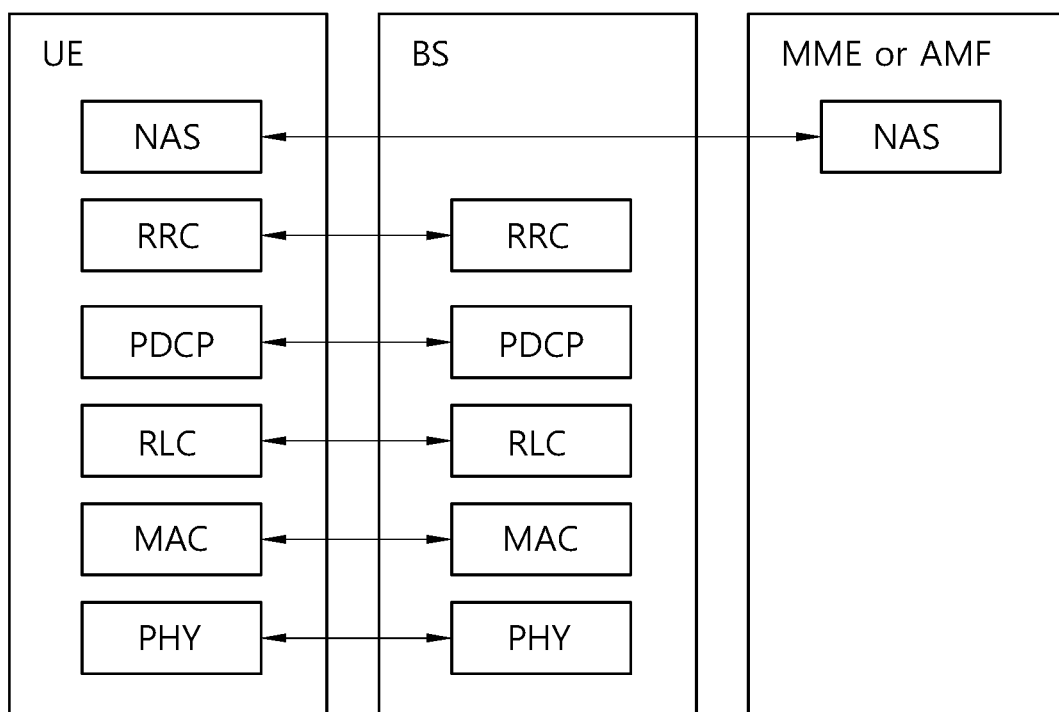

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
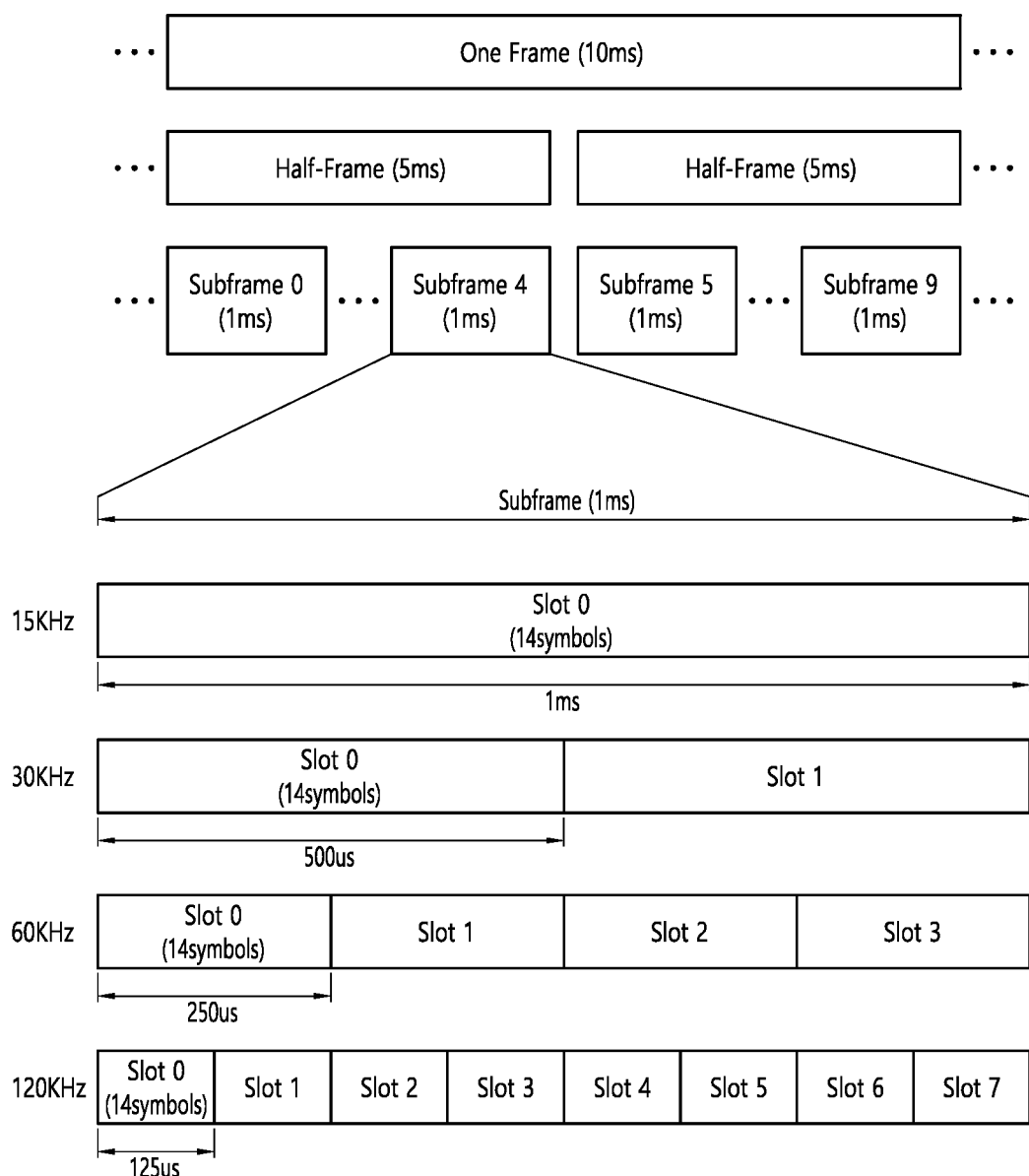
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f = 2^u * 15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f = 2^u * 15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i} - 1$, where i is the number of the bandwidth part. The relation between the physical resource block $n_{PRB}$ in the bandwidth part i and the common resource block $n_{CRB}$ is as follows: $n_{PRB} = n_{CRB} + N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
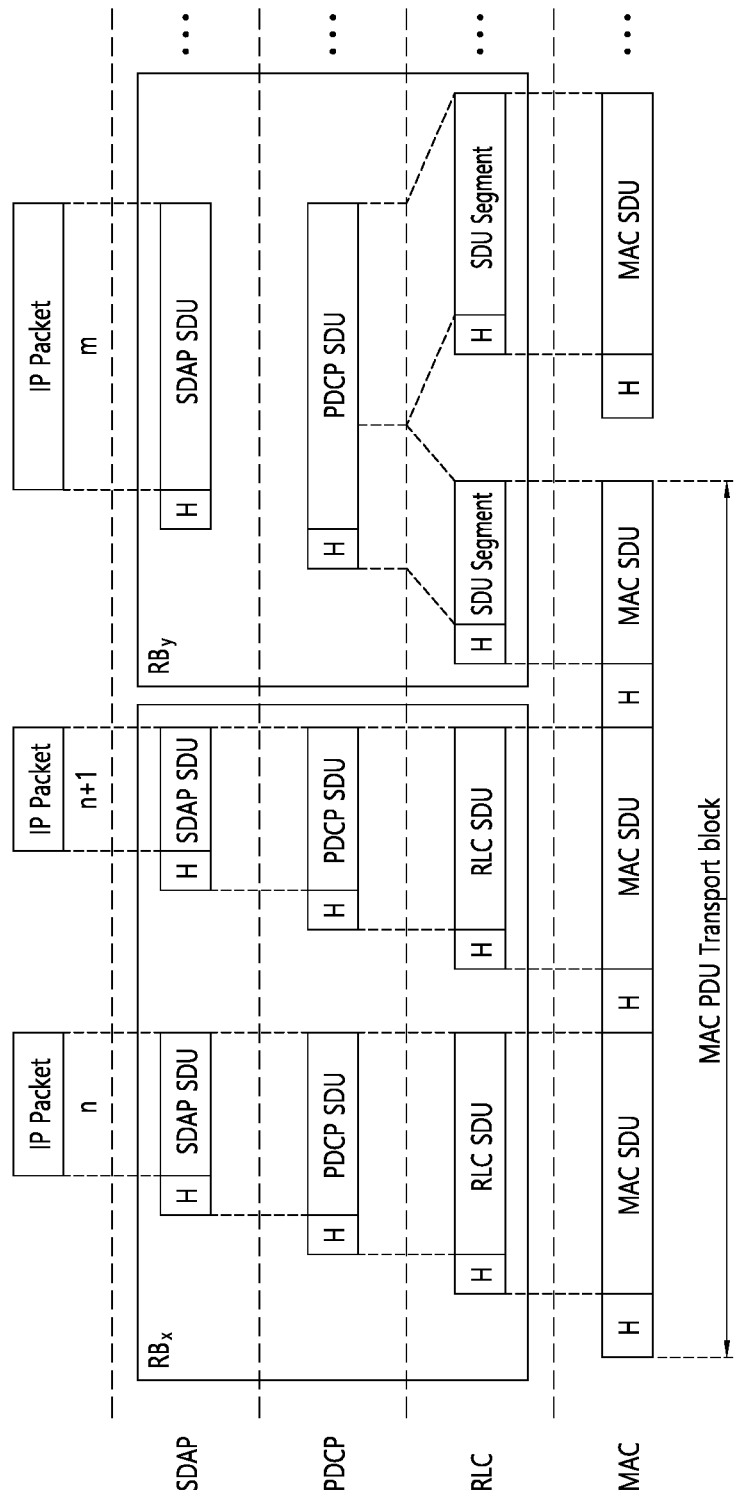
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels physical uplink shared channel (PUSCH) and physical random access channel (PRACH), respectively, and the downlink transport channels DL-SCH, BCH and PCH are mapped to physical downlink shared channel (PDSCH), physical broadcast channel (PBCH) and PDSCH, respectively. In the PHY layer, uplink control information (UCI) is mapped to physical uplink control channel (PUCCH), and downlink control information (DCI) is mapped to physical downlink control channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

Cell search is the procedure by which a UE acquires time and frequency synchronization with a cell and detects the cell ID of that cell. NR cell search is based on the primary synchronization signal (PSS) and secondary synchronization signal (SSS), and PBCH demodulation reference signal (DM-RS), located on the synchronization raster.

The cell search procedure of the UE can be summarized in Table 5.

TABLE 5

| | Type of Signals | Operations |
| --- | --- | --- |
| 1$^{st}$ step | PSS | * SS/PBCH block (SSB) symbol timing acquisition<br>* Cell ID detection within a cell ID group (3 hypothesis) |
| 2$^{nd}$ Step | SSS | * Cell ID group detection (336 hypothesis) |
| 3$^{rd}$ Step | PBCH DM-RS | * SSB index and Half frame index (Slot and frame boundary detection) |
| 4$^{th}$ Step | PBCH | * Time information (80 ms, SFN, SSB index, HF)<br>* RMSI CORESET/Search space configuration |
| 5$^{th}$ Step | PDCCH and PDSCH | * Cell access information<br>* RACH configuration |

Figure 10:
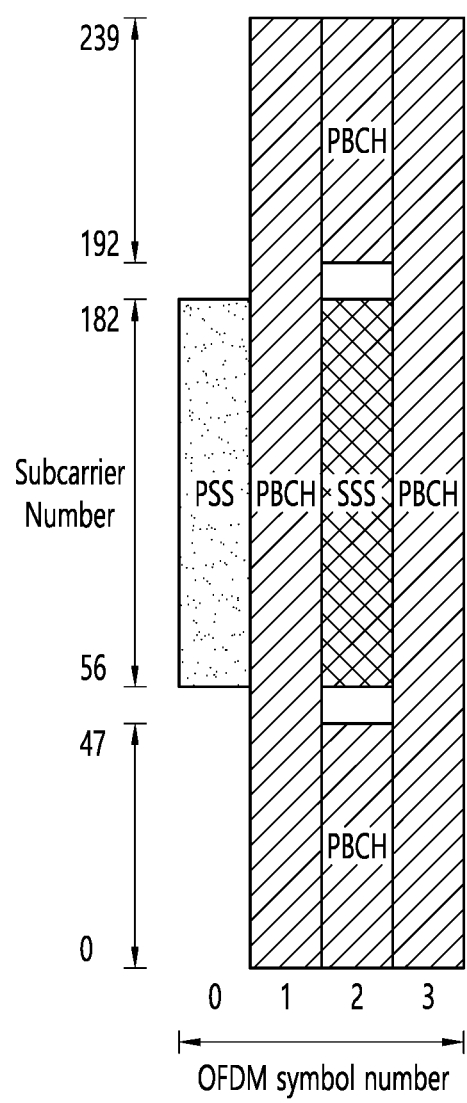
FIG. 10 shows an example of SSB to which implementations of the present disclosure is applied.

FIG. 10 shows an example of SSB to which implementations of the present disclosure is applied.

The SSB consists of PSS and SSS, each occupying 1 symbol and 127 subcarriers, and PBCH spanning across 3 OFDM symbols and 240 subcarriers, but on one symbol leaving an unused part in the middle for SSS. The possible time locations of SSBs within a half-frame are determined by subcarrier spacing and the periodicity of the half-frames where SSBs are transmitted is configured by the network. During a half-frame, different SSBs may be transmitted in different spatial directions (i.e. using different beams, spanning the coverage area of a cell).

Within the frequency span of a carrier, multiple SSBs can be transmitted. The physical cell IDs (PCIs) of SSBs transmitted in different frequency locations do not have to be unique, i.e., different SSBs in the frequency domain can have different PCIs. However, when an SSB is associated with a remaining minimum system information (RMSI), the SSB corresponds to an individual cell, which has a unique NR cell global identity (NCGI). Such an SSB is referred to as a cell-defining SSB (CD-SSB). A PCell is always associated to a CD-SSB located on the synchronization raster.

Polar coding is used for PBCH.

The UE may assume a band-specific subcarrier spacing for the SSB unless a network has configured the UE to assume a different sub-carrier spacing.

PBCH symbols carry its own frequency-multiplexed DM-RS.

Quadrature phase shift keying (QPSK) modulation is used for PBCH.

System information (SI) consists of a master information block (MIB) and a number of system information blocks (SIBs), which are divided into minimum SI and other SI.

(1) Minimum SI comprises basic information required for initial access and information for acquiring any other SI. Minimum SI consists of:

MIB contains cell barred status information and essential physical layer information of the cell required to receive further system information (e.g., SIB1), e.g. CORESET #0 configuration. MIB is always periodically broadcast on BCH with a periodicity of 80 ms and repetitions made within 80 ms. The first transmission of the MIB is scheduled in subframes as defined above for SS/PBCH block and repetitions are scheduled according to the period of SSB.

SIB1 defines the availability and the scheduling of other system information blocks (e.g., mapping of SIBs to SI message, periodicity, SI-window size) with an indication whether one or more SIBs are only provided on-demand and, in that case, the configuration needed by the UE to perform the SI request and contains information required for initial access. SIB1 is also referred to as RMSI and is periodically broadcast on DL-SCH or sent in a dedicated manner on DL-SCH to UEs in RRC_CONNECTED, with a periodicity of 160 ms and variable transmission repetition periodicity within 160 ms. The default transmission repetition periodicity of SIB1 is 20 ms but the actual transmission repetition periodicity is up to network implementation. For SSB and CORESET multiplexing pattern 1, SIB1 repetition transmission period is 20 ms. For SSB and CORESET multiplexing pattern 2/3, SIB1 transmission repetition period is the same as the SSB period. SIB1 is cell-specific SIB.

(2) Other SI encompasses all SIBs not broadcast in the minimum SI. Those SIBs can either be periodically broadcast on DL-SCH, broadcast on-demand on DL-SCH (i.e., upon request from UEs in RRC_IDLE or RRC_INACTIVE), or sent in a dedicated manner on DL-SCH to UEs in RRC_CONNECTED. SIBs in other SI are carried in SystemInformation (SI) messages. Only SIBs having the same periodicity can be mapped to the same SI message. Each SI message is transmitted within periodically occurring time domain windows (referred to as SI-windows with same length for all SI messages). Each SI message is associated with an SI-window and the SI-windows of different SI messages do not overlap. That is, within one SI-window only the corresponding SI message is transmitted. An SI message may be transmitted a number of times within the SI-window. Any SIB except SIB1 can be configured to be cell specific or area specific, using an indication in SIB1. The cell specific SIB is applicable only within a cell that provides the SIB while the area specific SIB is applicable within an area referred to as SI area, which consists of one or several cells and is identified by systemInformationAreaID. Other SI consists of:

SIB2 contains cell re-selection information, mainly related to the serving cell;

SIB3 contains information about the serving frequency and intra-frequency neighbouring cells relevant for cell re-selection (including cell re-selection parameters common for a frequency as well as cell specific re-selection parameters);

SIB4 contains information about other NR frequencies and inter-frequency neighbouring cells relevant for cell re-selection (including cell re-selection parameters common for a frequency as well as cell specific re-selection parameters);

SIB5 contains information about E-UTRA frequencies and E-UTRA neighbouring cells relevant for cell re-selection (including cell re-selection parameters common for a frequency as well as cell specific re-selection parameters);

SIB6 contains an earthquake and tsunami warning system (ETWS) primary notification;

SIB7 contains an ETWS secondary notification;

SIB8 contains a commercial mobile alert system (CMAS) warning notification;

SIB9 contains information related to global positioning system (GPS) time and coordinated universal Time (UTC).

For a UE in RRC_CONNECTED, the network can provide system information through dedicated signaling using the RRCReconfiguration message, e.g. if the UE has an active BWP with no common search space configured to monitor system information or paging.

For PSCell and SCells, the network provides the required SI by dedicated signaling, i.e., within an RRCReconfiguration message. Nevertheless, the UE shall acquire MIB of the PSCell to get system frame number (SFN) timing of the SCG (which may be different from MCG). Upon change of relevant SI for SCell, the network releases and adds the concerned SCell. For PSCell, the required SI can only be changed with Reconfiguration with Sync.

The physical layer imposes a limit to the maximum size a SIB can take. The maximum SIB1 or SI message size is 2976 bits.

Figure 11:
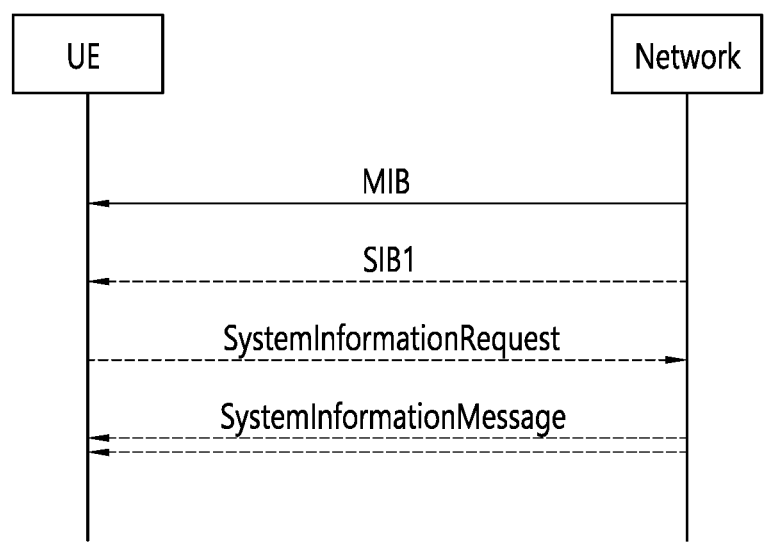
FIG. 11 shows an example of SI acquisition procedure to which implementations of the present disclosure is applied.

FIG. 11 shows an example of SI acquisition procedure to which implementations of the present disclosure is applied.

The UE applies the SI acquisition procedure to acquire the AS and NAS information. The procedure applies to UEs in RRC_IDLE, in RRC_INACTIVE and in RRC_CONNECTED.

The UE in RRC_IDLE and RRC_INACTIVE shall ensure having a valid version of (at least) the MIB, SIB1 through SIB4 and SIB5 (if the UE supports E-UTRA).

For a cell/frequency that is considered for camping by the UE, the UE is not required to acquire the contents of the minimum SI of that cell/frequency from another cell/frequency layer. This does not preclude the case that the UE applies stored SI from previously visited cell(s).

If the UE cannot determine the full contents of the minimum SI of a cell by receiving from that cell, the UE shall consider that cell as barred.

In case of bandwidth adaptation (BA), the UE only acquires SI on the active BWP.

For UEs in RRC_IDLE and RRC_INACTIVE, a request for other SI triggers a random access procedure where MSG3 includes the SI request message unless the requested SI is associated to a subset of the PRACH resources, in which case MSG1 is used for indication of the requested other SI. When MSG1 is used, the minimum granularity of the request is one SI message (i.e., a set of SIBs), one RACH preamble and/or PRACH resource can be used to request multiple SI messages and the gNB acknowledges the request in MSG2. When MSG 3 is used, the gNB acknowledges the request in MSG4.

The other SI may be broadcast at a configurable periodicity and for a certain duration. The other SI may also be broadcast when it is requested by UE in RRC_IDLE/RRC_INACTIVE.

For a UE to be allowed to camp on a cell it must have acquired the contents of the minimum SI from that cell. There may be cells in the system that do not broadcast the minimum SI and where the UE therefore cannot camp.

Change of system information (other than for ETWS/CMAS4) only occurs at specific radio frames, i.e., the concept of a modification period is used. System information may be transmitted a number of times with the same content within a modification period, as defined by its scheduling. The modification period is configured by system information.

When the network changes (some of the) system information, it first notifies the UEs about this change, i.e., this may be done throughout a modification period. In the next modification period, the network transmits the updated system information. Upon receiving a change notification, the UE acquires the new system information from the start of the next modification period. The UE applies the previously acquired system information until the UE acquires the new system information.

The random access procedure of the UE can be summarized in Table 6.

TABLE 6

| | Type of Signals | Operations/Information Acquired |
|---|---|---|
| $1^{st}$ step | PRACH preamble in UL | * Initial beam acquisition<br>* Random election of RA-preamble ID |
| $2^{nd}$ Step | Random Access Response on DL-SCH | * Timing alignment information<br>* RA-preamble ID<br>* Initial UL grant, Temporary C-RNTI |
| $3^{rd}$ Step | UL transmission on UL-SCH | * RRC connection request<br>* UE identifier |
| $4^{th}$ Step | Contention Resolution on DL | * Temporary C-RNTI on PDCCH for initial access<br>* C-RNTI on PDCCH for UE in RRC_CONNECTED |

The random access procedure is triggered by a number of events:—Initial access from RRC_IDLE;
RRC connection re-establishment procedure;
DL or UL data arrival during RRC_CONNECTED when UL synchronization status is "non-synchronized";
UL data arrival during RRC_CONNECTED when there are no PUCCH resources for scheduling request (SR) available;
SR failure;
Request by RRC upon synchronous reconfiguration (e.g., handover);
Transition from RRC_INACTIVE;
To establish time alignment for a secondary timing advance group (TAG);
Request for other SI;
Beam failure recovery.

Figure 12:
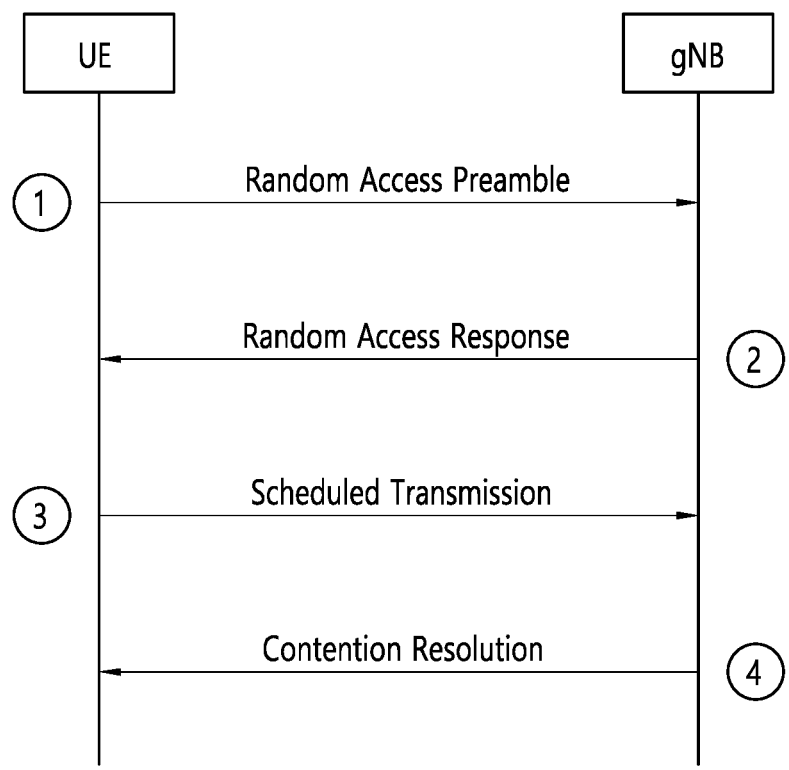
FIG. 12 shows an example of contention-based random access (CBRA) to which implementations of the present disclosure is applied.
Figure 13:
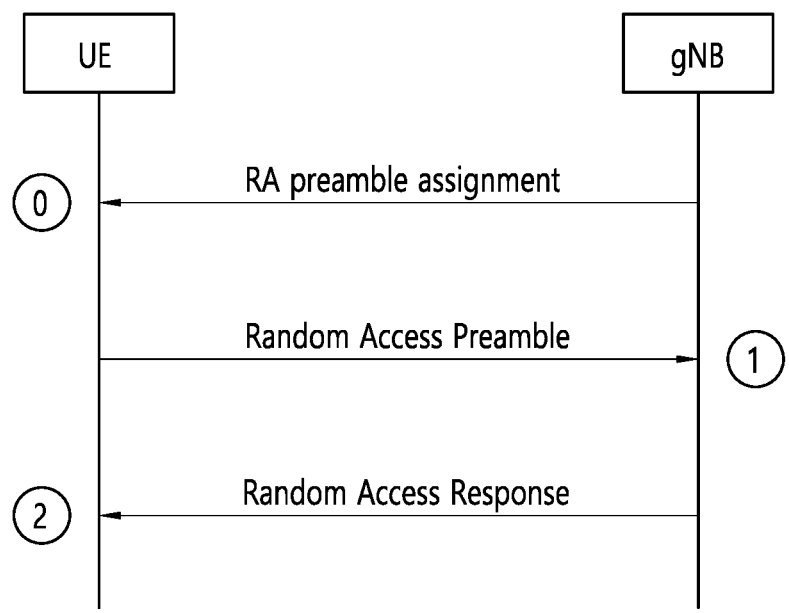
FIG. 13 shows an example of contention-free random access (CFRA) to which implementations of the present disclosure is applied.

FIG. 12 shows an example of contention-based random access (CBRA) to which implementations of the present disclosure is applied. FIG. 13 shows an example of contention-free random access (CFRA) to which implementations of the present disclosure is applied.

For random access in a cell configured with supplementary UL (SUL), the network can explicitly signal which carrier to use (UL or SUL). Otherwise, the UE selects the SUL carrier if and only if the measured quality of the DL is lower than a broadcast threshold. Once started, all uplink transmissions of the random access procedure remain on the selected carrier.

When CA is configured, the first three steps of CBRA always occur on the PCell while contention resolution (step 4) can be cross-scheduled by the PCell. The three steps of a CFRA started on the PCell remain on the PCell. CFRA on SCell can only be initiated by the gNB to establish timing advance for a secondary TAG: the procedure is initiated by the gNB with a PDCCH order (step 0) that is sent on a scheduling cell of an activated SCell of the secondary TAG, preamble transmission (step 1) takes place on the indicated SCell, and random access response (step 2) takes place on PCell.

Random access preamble sequences, of two different lengths are supported. Long sequence length 839 is applied with subcarrier spacings of 1.25 and 5 kHz and short sequence length 139 is applied with subcarrier spacings of 15, 30, 60 and 120 kHz. Long sequences support unrestricted sets and restricted sets of Type A and Type B, while short sequences support unrestricted sets only.

Multiple PRACH preamble formats are defined with one or more PRACH OFDM symbols, and different cyclic prefix and guard time. The PRACH preamble configuration to use is provided to the UE in the system information.

The UE calculates the PRACH transmit power for the retransmission of the preamble based on the most recent estimate pathloss and power ramping counter.

Figure 14:
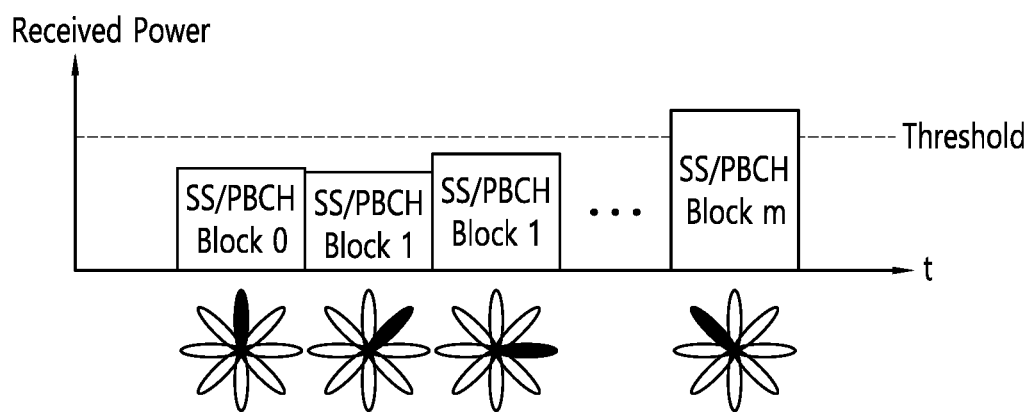
FIG. 14 shows a concept of threshold of the SSB for RACH resource association to which implementations of the present disclosure is applied.

FIG. 14 shows a concept of threshold of the SSB for RACH resource association to which implementations of the present disclosure is applied.

The system information provides information for the UE to determine the association between the SSB and the RACH resources. The reference signal received power (RSRP) threshold for SSB selection for RACH resource association is configurable by network.

Figure 15:
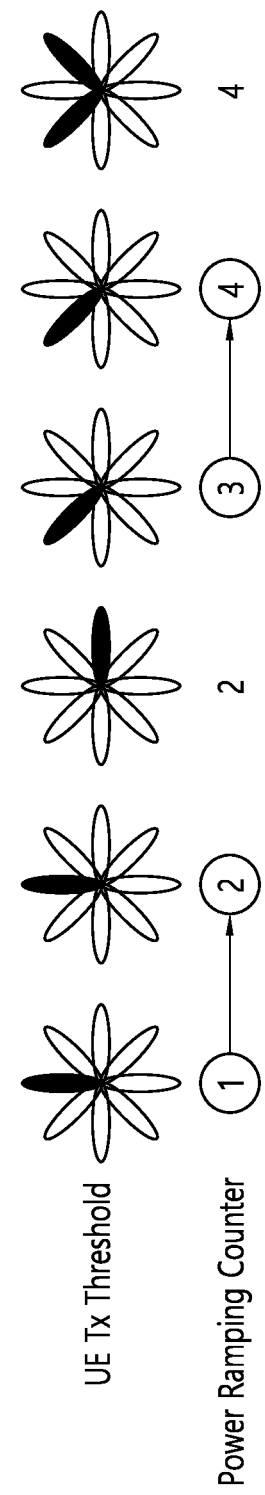
FIG. 15 shows an example of operation of power ramping counter to which implementations of the present disclosure is applied.

FIG. 15 shows an example of operation of power ramping counter to which implementations of the present disclosure is applied.

If the UE conducts beam switching, the counter of power ramping remains unchanged. For example, the UE may perform power ramping for retransmission of the random access preamble based on a power ramping counter. However, the power ramping counter remains unchanged if a UE conducts beam switching in the PRACH retransmissions. Referring to FIG. 15, the UE may increase the power ramping counter by 1, when the UE retransmit the random access preamble for the same beam. However, when the beam had been changed, the power ramping counter remains unchanged.

Multi-radio dual connectivity (MR-DC) is described. Section 4 of 3GPP TS 37.340 V15.4.0 (2018-12) can be referred.

In MR-DC, the following definitions may be used.
en-gNB: node providing NR user plane and control plane protocol terminations towards the UE, and acting as secondary node in EN-DC.
Master cell group (MCG): in MR-DC, a group of serving cells associated with the master node, comprising of the SpCell (PCell) and optionally one or more SCells.
Master node (MN): in MR-DC, the radio access node that provides the control plane connection to the core network. It may be a master eNB (in EN-DC), a master ng-eNB (in NGEN-DC) or a master gNB (in NR-DC and NE-DC).
MCG bearer: in MR-DC, a radio bearer with an RLC bearer (or two RLC bearers, in case of CA packet duplication) only in the MCG.
MN terminated bearer: in MR-DC, a radio bearer for which PDCP is located in the MN.

MCG SRB: in MR-DC, a direct SRB between the MN and the UE.

Multi-radio dual connectivity (MR-DC): Dual connectivity between E-UTRA and NR nodes, or between two NR nodes.

Ng-eNB: node providing E-UTRA user plane and control plane protocol terminations towards the UE, and connected via the NG interface to the 5GC.

PCell: SpCell of a master cell group.

PSCell: SpCell of a secondary cell group.

RLC bearer: RLC and MAC logical channel configuration of a radio bearer in one cell group.

Secondary cell group (SCG): in MR-DC, a group of serving cells associated with the Secondary Node, comprising of the SpCell (PSCell) and optionally one or more SCells.

Secondary node (SN): in MR-DC, the radio access node, with no control plane connection to the core network, providing additional resources to the UE. It may be an en-gNB (in EN-DC), a Secondary ng-eNB (in NE-DC) or a Secondary gNB (in NR-DC and NGEN-DC).

SCG bearer: in MR-DC, a radio bearer with an RLC bearer (or two RLC bearers, in case of CA packet duplication) only in the SCG.

SN terminated bearer: in MR-DC, a radio bearer for which PDCP is located in the SN.

SpCell: primary cell of a master or secondary cell group.

Split bearer: in MR-DC, a radio bearer with RLC bearers both in MCG and SCG.

Split SRB: in MR-DC, a SRB between the MN and the UE with RLC bearers both in MCG and SCG.

MR-DC is a generalization of the intra-E-UTRA DC, where a multiple Rx/Tx UE may be configured to utilize resources provided by two different nodes connected via non-ideal backhaul, one providing NR access and the other one providing either E-UTRA or NR access. One node acts as the MN and the other as the SN. The MN and SN are connected via a network interface and at least the MN is connected to the core network.

MR-DC is designed based on the assumption of non-ideal backhaul between the different nodes but can also be used in case of ideal backhaul.

Figure 16:
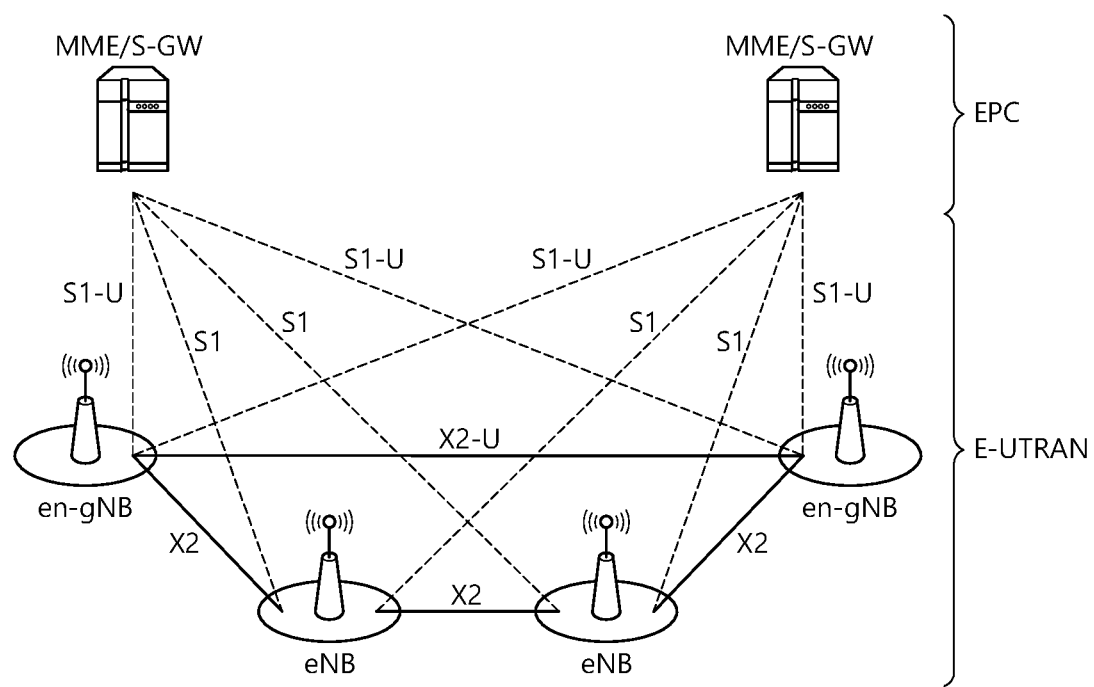
FIG. 16 shows an example of EN-DC overall architecture to which implementations of the present disclosure is applied.

FIG. 16 shows an example of EN-DC overall architecture to which implementations of the present disclosure is applied.

E-UTRAN supports MR-DC via E-UTRA-NR dual connectivity (EN-DC), in which a UE is connected to one eNB that acts as a MN and one en-gNB that acts as a SN. The eNB is connected to the EPC via the S1 interface and to the en-gNB via the X2 interface. The en-gNB might also be connected to the EPC via the S1-U interface and other en-gNBs via the X2-U interface.

NG-RAN supports NG-RAN E-UTRA-NR dual connectivity (NGEN-DC), in which a UE is connected to one ng-eNB that acts as a MN and one gNB that acts as a SN. The ng-eNB is connected to the 5GC and the gNB is connected to the ng-eNB via the Xn interface.

NG-RAN supports NR-E-UTRA dual connectivity (NE-DC), in which a UE is connected to one gNB that acts as a MN and one ng-eNB that acts as a SN. The gNB is connected to 5GC and the ng-eNB is connected to the gNB via the Xn interface.

NG-RAN supports NR-NR dual connectivity (NR-DC), in which a UE is connected to one gNB that acts as a MN and another gNB that acts as a SN. The master gNB is connected to the 5GC via the NG interface and to the secondary gNB via the Xn interface. The secondary gNB might also be connected to the 5GC via the NG-U interface. In addition, NR-DC can also be used when a UE is connected to two gNB-DUs, one serving the MCG and the other serving the SCG, connected to the same gNB-CU, acting both as a MN and as a SN.

Figure 17:
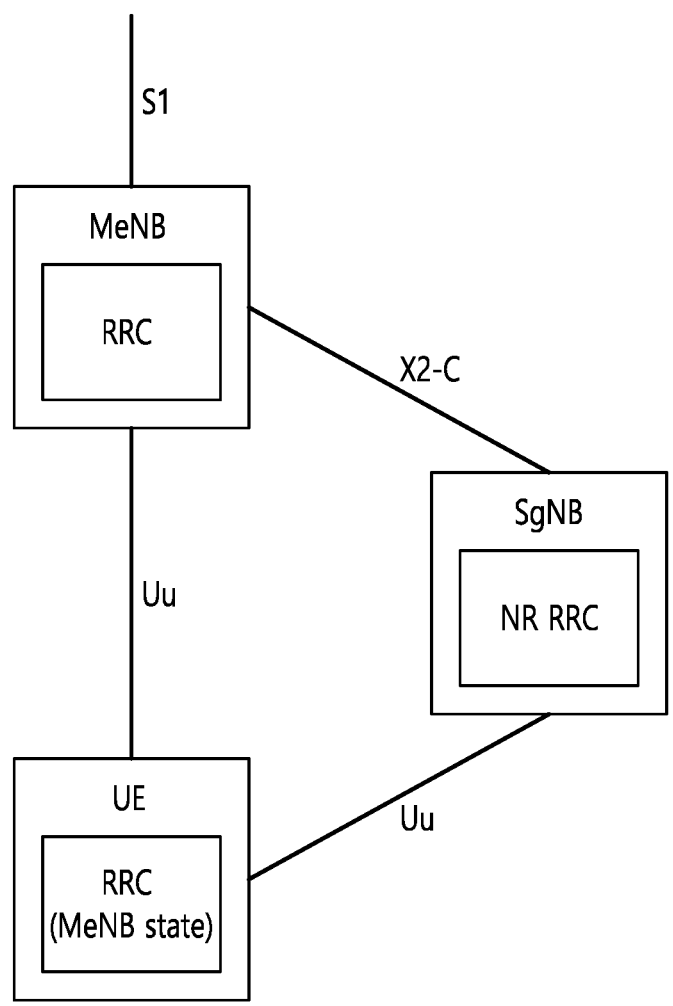
FIG. 17 shows an example of a control plane architecture for EN-DC to which implementations of the present disclosure is applied.
Figure 18:
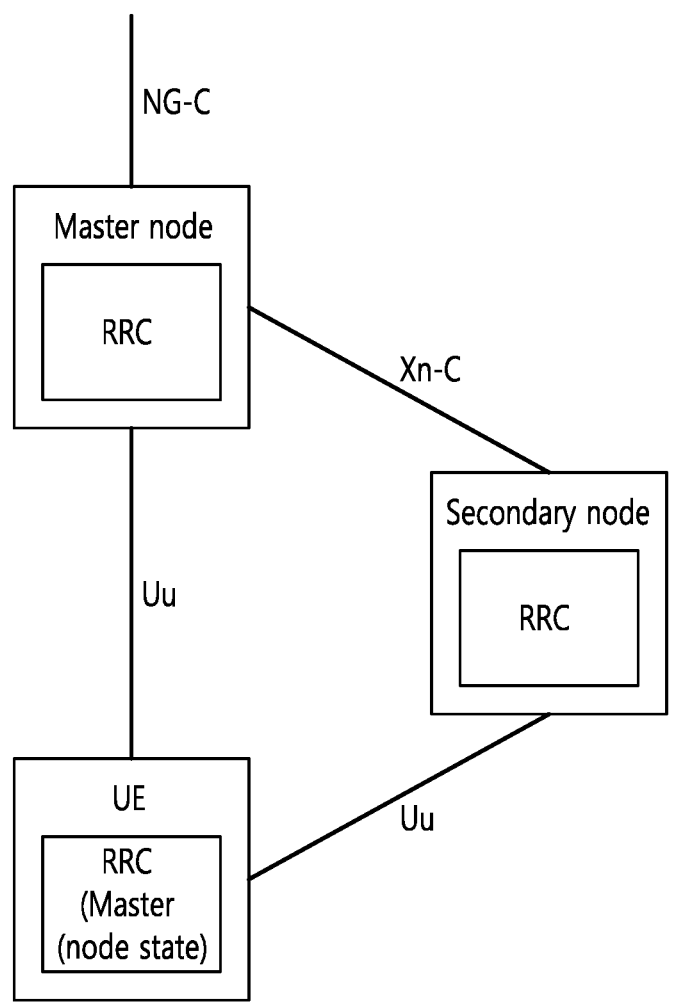
FIG. 18 shows an example of a control plane architecture for MR-DC to which implementations of the present disclosure is applied.

FIG. 17 shows an example of a control plane architecture for EN-DC to which implementations of the present disclosure is applied. FIG. 18 shows an example of a control plane architecture for MR-DC to which implementations of the present disclosure is applied.

In MR-DC, the UE has a single RRC state, based on the MN RRC and a single C-plane connection towards the core network. Referring to FIGS. 17 and 18, each radio node has its own RRC entity (E-UTRA version if the node is an eNB or NR version if the node is a gNB) which can generate RRC PDUs to be sent to the UE.

RRC PDUs generated by the SN can be transported via the MN to the UE. The MN always sends the initial SN RRC configuration via MCG SRB (SRB1), but subsequent reconfigurations may be transported via MN or SN. When transporting RRC PDU from the SN, the MN does not modify the UE configuration provided by the SN.

In E-UTRA connected to EPC, at initial connection establishment SRB1 uses E-UTRA PDCP. If the UE supports EN-DC, regardless whether EN-DC is configured or not, after initial connection establishment, MCG SRBs (SRB1 and SRB2) can be configured by the network to use either E-UTRA PDCP or NR PDCP (either SRB1 and SRB2 are both configured with E-UTRA PDCP, or they are both configured with NR PDCP). Change from E-UTRA PDCP to NR PDCP (or vice-versa) is supported via a handover procedure (reconfiguration with mobility) or, for the initial change of SRB1 from E-UTRA PDCP to NR PDCP, with a reconfiguration without mobility before the initial security activation.

If the SN is a gNB (i.e., for EN-DC, NGEN-DC and NR-DC), the UE can be configured to establish a SRB with the SN (SRB3) to enable RRC PDUs for the SN to be sent directly between the UE and the SN. RRC PDUs for the SN can only be transported directly to the UE for SN RRC reconfiguration not requiring any coordination with the MN. Measurement reporting for mobility within the SN can be done directly from the UE to the SN if SRB3 is configured.

Split SRB is supported for all MR-DC options, allowing duplication of RRC PDUs generated by the MN, via the direct path and via the SN. Split SRB uses NR PDCP.

In EN-DC, the SCG configuration is kept in the UE during suspension. The UE releases the SCG configuration (but not the radio bearer configuration) during resumption initiation.

In MR-DC with 5GC, the UE stores the PDCP/SDAP configuration when moving to RRC Inactive but it releases the SCG configuration.

In MR-DC, from a UE perspective, three bearer types exist: MCG bearer, SCG bearer and split bearer.

For EN-DC, the network can configure either E-UTRA PDCP or NR PDCP for MN terminated MCG bearers while NR PDCP is always used for all other bearers.

In MR-DC with 5GC, NR PDCP is always used for all bearer types. In NGEN-DC, E-UTRA RLC/MAC is used in the MN while NR RLC/MAC is used in the SN. In NE-DC, NR RLC/MAC is used in the MN while E-UTRA RLC/MAC is used in the SN. In NR-DC, NR RLC/MAC is used in both MN and SN.

From a network perspective, each bearer (MCG, SCG and split bearer) can be terminated either in MN or in SN.

Even if only SCG bearers are configured for a UE, for SRB1 and SRB2 the logical channels are always configured at least in the MCG, i.e., this is still an MR-DC configuration and a PCell always exists.

If only MCG bearers are configured for a UE, i.e., there is no SCG, this is still considered an MR-DC configuration, as long as at least one of the bearers is terminated in the SN.

In MR-DC, there is an interface between the MN and the SN for control plane signaling and coordination. For each MR-DC UE, there is also one control plane connection between the MN and a corresponding core network entity. The MN and the SN involved in MR-DC for a certain UE control their radio resources and are primarily responsible for allocating radio resources of their cells.

In MR-DC with EPC (EN-DC), the involved core network entity is the mobility management entity (MME). S1-MME is terminated in MN and the MN and the SN are interconnected via X2-C.

In MR-DC with 5GC (NGEN-DC, NE-DC and NR-DC), the involved core network entity is the access and mobility management function (AMF). NG-C is terminated in the MN and the MN and the SN are interconnected via Xn-C.

There are different U-plane connectivity options of the MN and SN involved in MR-DC for a certain UE. The U-plane connectivity depends on the bearer option configured:

For MN terminated bearers, the user plane connection to the CN entity is terminated in the MN;
For SN terminated bearers, the user plane connection to the CN entity is terminated in the SN;
The transport of user plane data over the Uu either involves MCG or SCG radio resources or both:
For MCG bearers, only MCG radio resources are involved;
For SCG bearers, only SCG radio resources are involved;
For split bearers, both MCG and SCG radio resources are involved.
For split bearers, MN terminated SCG bearers and SN terminated MCG bearers, PDCP data is transferred between the MN and the SN via the MN-SN user plane interface.

For MR-DC with EPC (EN-DC), X2-U interface is the user plane interface between MN and SN, and S1-U is the user plane interface between the MN, the SN or both and the serving gateway (S-GW).

For MR-DC with 5GC (NGEN-DC, NE-DC and inter-gNB NR-DC), Xn-U interface is the user plane interface between MN and SN, and NG-U is the user plane interface between the MN, the SN or both and the user plane function (UPF).

RRC connection re-establishment is described. Section 5.3.7 of 3GPP TS 38.331 V15.4.0 (2018-12) can be referred.

The purpose of this procedure is to re-establish the RRC connection. A UE in RRC_CONNECTED, for which security has been activated with SRB2 and at least one DRB setup, may initiate the procedure in order to continue the RRC connection. The connection re-establishment succeeds if the network is able to find and verify a valid UE context or, if the UE context cannot be retrieved, and the network responds with an RRCSetup. If AS security has not been activated, the UE does not initiate the procedure but instead moves to RRC_IDLE directly, with release cause 'other'. If AS security has been activated, but SRB2 and at least one DRB are not setup, the UE does not initiate the procedure but instead moves to RRC_IDLE directly, with release cause 'RRC connection failure'.

The network applies the procedure as follows:
> When AS security has been activated and the network retrieves or verifies the UE context:
>> to re-activate AS security without changing algorithms;
>> to re-establish and resume the SRB1;
> When UE is re-establishing an RRC connection, and the network is not able to retrieve or verify the UE context:
>> to discard the stored AS Context and release all RB;
>> fallback to establish a new RRC connection.

Figure 19:
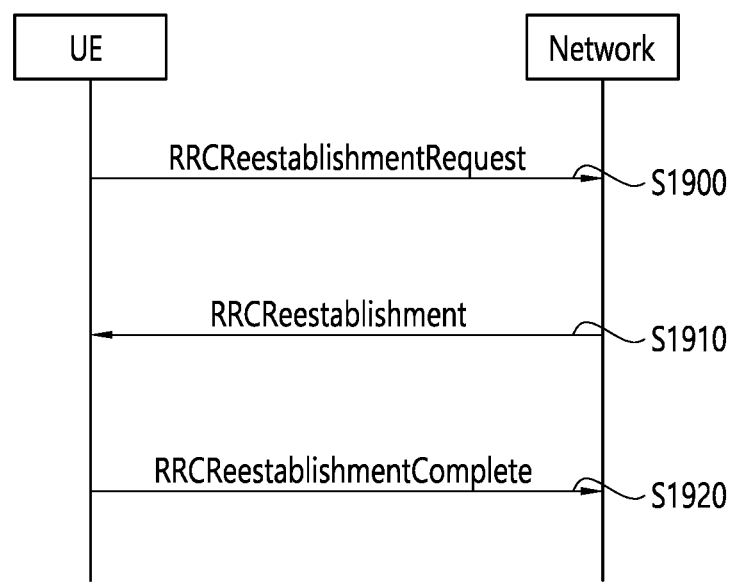
FIG. 19 shows an example of RRC connection re-establishment to which implementations of the present disclosure is applied.

FIG. 19 shows an example of RRC connection re-establishment to which implementations of the present disclosure is applied.

The UE initiates the procedure when one of the following conditions is met:
1> upon detecting radio link failure of the MCG; or
1> upon re-configuration with sync failure of the MCG; or
1> upon mobility from NR failure; or
1> upon integrity check failure indication from lower layers concerning SRB1 or SRB2, except if the integrity check failure is detected on the RRCReestablishment message; or
1> upon an RRC connection reconfiguration failure.

Upon initiation of the procedure, the UE shall:
1> stop timer T310, if running;
1> stop timer T304, if running;
1> start timer T311;
1> suspend all RBs, except SRB0;
1> reset MAC;
1> release the MCG SCell(s), if configured;
1> release the current dedicated ServingCell configuration;
1> release delayBudgetReportingConfig, if configured, and stop timer T342, if running;
1> release overheatingAssistanceConfig, if configured and stop timer T345, if running;
1> perform cell selection in accordance with the cell selection process which will be described below in detail.

Upon selecting a suitable NR cell, the UE shall:
1> ensure having valid and up to date essential system information;
1> stop timer T311;
1> start timer T301;
1> if T390 is running:
2> stop timer T390 for all access categories;
2> perform the actions for barring alleviation;
1> apply the default L1 parameter values as specified in corresponding physical layer specifications except for the parameters for which values are provided in SIB1;
1> apply the default MAC Cell Group configuration;
1> apply the timeAlignmentTimerCommon included in SIB1;
1> initiate transmission of the RRCReestablishmentRequest message;

This procedure applies also if the UE returns to the source PCell.

Upon initiating an inter-RAT cell, the UE shall:
1> perform the actions upon going to RRC_IDLE, with release cause 'RRC connection failure'.

In step S1900, the UE transmits the RRCReestablishmentRequest message to the network.

The UE shall set the contents of RRCReestablishmentRequest message as follows:
1> set the ue-Identity as follows:
2> set the c-RNTI to the cell radio network temporary identity (C-RNTI) used in the source PCell (reconfiguration with sync or mobility from NR failure) or used in the PCell in which the trigger for the re-establishment occurred (other cases);

2> set the physCellId to the physical cell identity of the source PCell (reconfiguration with sync or mobility from NR failure) or of the PCell in which the trigger for the re-establishment occurred (other cases);

2> set the shortMAC-I to the 16 least significant bits of the MAC-I calculated:

3> over the ASN.1 encoded (i.e., a multiple of 8 bits) VarShortMAC-Input;

3> with the $K_{RRCint}$ key and integrity protection algorithm that was used in the source PCell (reconfiguration with sync or mobility from NR failure) or of the PCell in which the trigger for the re-establishment occurred (other cases); and 3> with all input bits for COUNT, BEARER and DIRECTION set to binary ones;

1> set the reestablishmentCause as follows:

2> if the re-establishment procedure was initiated due to reconfiguration failure:

3> set the reestablishmentCause to the value reconfigurationFailure;

2> else if the re-establishment procedure was initiated due to reconfiguration with sync failure (intra-NR handover failure or inter-RAT mobility from NR failure):

3> set the reestablishmentCause to the value handoverFailure;

2> else:

3> set the reestablishmentCause to the value otherFailure;

1> re-establish PDCP for SRB1;

1> re-establish RLC for SRB1;

1> apply the specified configuration for SRB1;

1> configure lower layers to suspend integrity protection and ciphering for SRB1;

Ciphering is not applied for the subsequent RRCReestablishment message used to resume the connection. An integrity check is performed by lower layers, but merely upon request from RRC.

1> resume SRB1;

1> submit the RRCReestablishmentRequest message to lower layers for transmission.

In step S1910, the UE receives the RRCReestablishment message from the network. In step S1920, the UE transmits the RRCReestablishmentComplete message to the network. The UE shall:

1> stop timer T301;

1> consider the current cell to be the PCell;

1> store the nextHopChainingCount value indicated in the RRCReestablishment message;

1> update the $K_{gNB}$ key based on the current $K_{gNB}$ or the NH, using the stored nextHopChainingCount value;

1> derive $K_{RRCenc}$ and $K_{UPenc}$ key associated with the previously configured cipheringAlgorithm;

1> derive the $K_{RRCint}$ and $K_{UPint}$ key associated with the previously configured integrityProtAlgorithm.

1> request lower layers to verify the integrity protection of the RRCReestablishment message, using the previously configured algorithm and the $K_{RRCint}$ key;

1> if the integrity protection check of the RRCReestablishment message fails:

2> perform the actions upon going to RRC_IDLE, with release cause 'RRC connection failure', upon which the procedure ends;

1> configure lower layers to resume integrity protection for SRB1 using the previously configured algorithm and the $K_{RRCint}$ key immediately, i.e., integrity protection shall be applied to all subsequent messages received and sent by the UE, including the message used to indicate the successful completion of the procedure;

1> configure lower layers to resume ciphering for SRB1 using the previously configured algorithm and, the $K_{RRCenc}$ key immediately, i.e., ciphering shall be applied to all subsequent messages received and sent by the UE, including the message used to indicate the successful completion of the procedure;

1> release the measurement gap configuration indicated by the measGapConfig, if configured;

1> submit the RRCReestablishmentComplete message to lower layers for transmission;

1> the procedure ends.

Upon T311 expiry, the UE shall:

1> perform the actions upon going to RRC_IDLE, with release cause 'RRC connection failure'.

The UE shall:

1> if timer T301 expires; or

1> if the selected cell becomes no longer suitable according to the cell selection criteria:

2> perform the actions upon going to RRC_IDLE, with release cause 'RRC connection failure'.

Upon reception of the RRCSetup by the UE, the UE shall:

1> perform the RRC connection establishment procedure.

As mentioned above, a wireless device (e.g., UE) in RRC_CONNECTED may be configured with MCG and SCG for dual connectivity. Upon detection of MCG failure, the wireless device may trigger RRC connection re-establishment procedure in which the wireless device performs cell selection and RACH procedure towards the selected cell for RRC connection recovery. However, in this procedure, the wireless device should reconfigure DRBs and so it will take some to re-start data transmission.

To address delay problem due to the RRC connection re-establishment procedure as described above, upon MCG failure detection, the wireless device configured with SCG may be able to inform the network of the MCG failure detection by using SCG link. The SCG may forward the information on the MCG failure detection received from the wireless device to the MCG, and the MCG may attempt the RRC connection with the wireless device.

However, some wireless device may not need SCG resources while using low data rate services. Or, some wireless device may not support dual connectivity at all. Thus, some wireless device could always not use SCG link to recover from MCG failure.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

In some implementations, the method in perspective of the wireless device described below may be performed by first wireless device 100 shown in FIG. 2, the wireless device 100 shown in FIG. 3, the first wireless device 100 shown in FIG. 4 and/or the UE 100 shown in FIG. 5.

In some implementations, the method in perspective of the wireless device described below may be performed by control of the processor 102 included in the first wireless device 100 shown in FIG. 2, by control of the communication unit 110 and/or the control unit 120 included in the wireless device 100 shown in FIG. 3, by control of the processor 102 included in the first wireless device 100 shown in FIG. 4 and/or by control of the processor 102 included in the UE 100 shown in FIG. 5.

Figure 20:
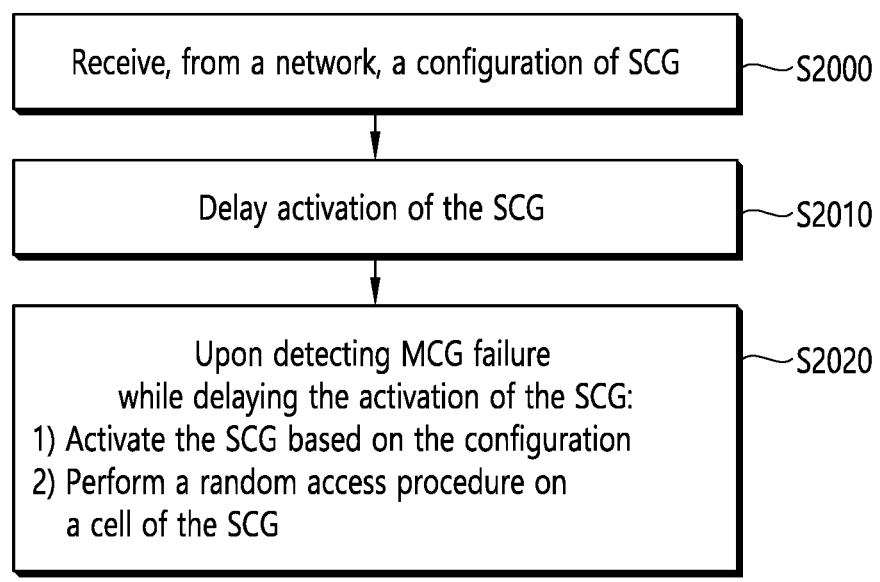
FIG. 20 shows an example of a method for a wireless device to which implementations of the present disclosure is applied.

FIG. 20 shows an example of a method for a wireless device to which implementations of the present disclosure is applied.

In some implementations, the wireless device, e.g., UE, may be in communication with at least one of a mobile device, a network, and/or autonomous vehicles other than the wireless device.

In step S2000, the wireless device receives, from a network, a configuration of a SCG.

In step S2010, the wireless device delays activation of the SCG.

In step S2020, upon detecting a failure on a MCG while delaying the activation of the SCG, the wireless device activates the SCG based on the configuration, and performs a random access procedure on a cell of the SCG.

In some implementations, the MCG may consist of at least one PCell and zero or more SCells. The SCG may consist of at least one PSCell and zero or more SCells. The cell of the SCG may be a PSCell.

In some implementations, a suspension indication may be received with the configuration. The activation of the SCG may be delayed based on the suspension indication.

In some implementations, delaying the activation of the SCG may comprise suspending the configuration. The configuration may include a configuration of one or more split RBs, and a transmission of the one or more split RBs related to the SCG may be suspended.

In some implementations, delaying the activation of the SCG may comprise applying the configuration in which the cell of the SCG is configured to be in a deactivated state and/or a dormant state. When the cell of the SCG is in dormant state, the wireless device may not need to receive the corresponding PDCCH and/or PDSCH, cannot transmit in the corresponding uplink, but is required to perform channel quality indicator (CQI) measurements. A PUCCH SCell cannot be in dormant state.

In some implementations, activating the SCG based on the configuration may comprise applying the configuration in which the cell of the SCG is configured to be in an activated state.

In some implementations, information related to detection of the failure on the MCG may be indicated to the SCG during the random access procedure. The information related to detection of the failure on the MCG may be indicated via a message 3 of the random access procedure. The information related to detection of the failure on the MCG may be indicated over a SCG transmission of a MCG split SRB and/or a SCG SRB.

Figure 21:
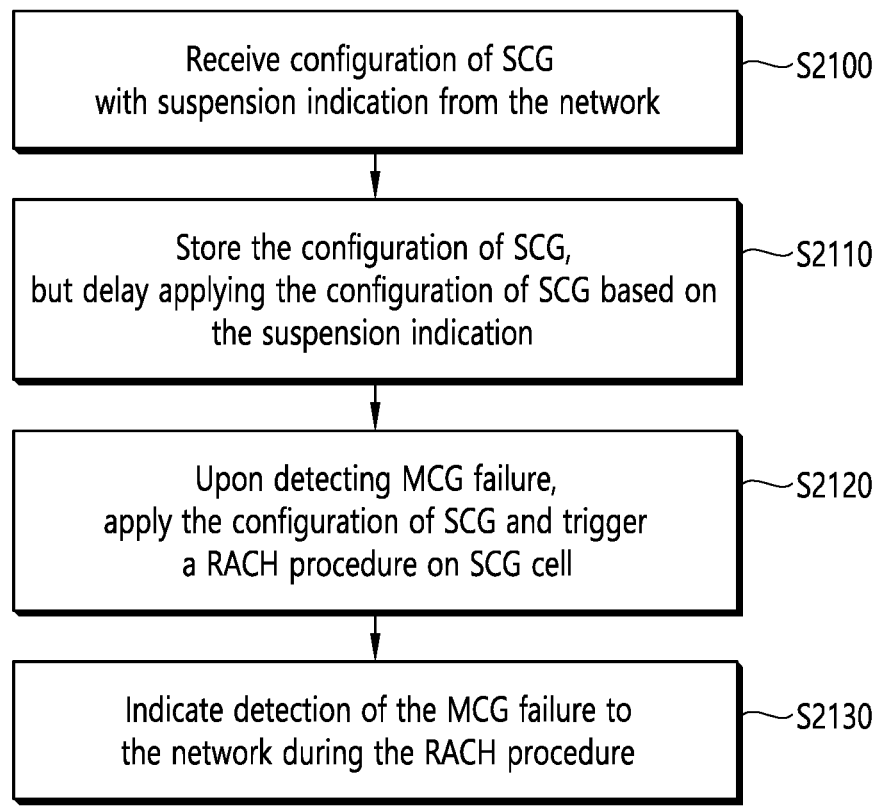
FIG. 21 shows an example of a method for fast recovery from connection failure by using a SCell to which implementations of the present disclosure is applied.

FIG. 21 shows an example of a method for fast recovery from connection failure by using a SCell to which implementations of the present disclosure is applied.

In step S2100, the UE configured with MCG receives configuration of SCG with a suspension indication from the network.

In some implementations, the MCG may consist of at least one PCell and zero, one or more SCells as MCG cell(s). The SCG may consist of at least one PSCell and zero, one or more SCells as SCG cell(s).

In steep S2110, upon receiving the configuration of SCG with the suspension indication, the UE stores the configuration of SCG but delays applying the configuration of SCG based on the suspension indication.

In some implementations, the UE may suspend the configuration of SCG.

In some implementations, if the configuration of SCG includes configuration of one or more split radio bearers, the UE may partially apply only the configuration of the split radio bearers and then suspends SCG transmission of the split radio bearers.

In some implementations, instead of delaying applying the configuration of SCG based on the suspension indication, the UE may apply the configuration of SCG in which the SCG cell(s) is configured to be in deactivated and/or dormant state. When the SCG cell(s) is in dormant state, the UE may not need to receive the corresponding PDCCH and/or PDSCH, cannot transmit in the corresponding uplink, but is required to perform CQI measurements. A PUCCH SCell cannot be in dormant state.

In step S2120, upon detecting MCG failure, if the configuration of SCG has been delayed (e.g., suspended) in step S2110, the UE applies the configuration of SCG in which the SCG cell(s) is configured to be in activated state, and triggers a RACH procedure on the SCG cell.

In some implementations, upon detecting the MCG failure, if the SCG cell(s) has been configured to be in deactivated and/or dormant state, the UE may autonomously activate the SCG cell(s) and trigger a RACH procedure on the SCG cell.

In some implementations, the SCG cell may be the PSCell.

In step S2230, the UE indicates detection of MCG failure to the network (e.g., SCG cell(s)) during the RACH procedure.

In some implementations, the indication may be indicated via MSG3 of the RACH procedure. The indication may be carried over SCG transmission of a MCG split SRB and/or SRB3 (i.e., SCG SRB).

In some implementations, upon receiving the indication from the UE, the SN controlling the SCG may carry/forward the indication to the MN controlling the MCG. Then, the MN may send configuration of MCG to the UE, so that UE may reconfigure the MCG.

Figure 22:
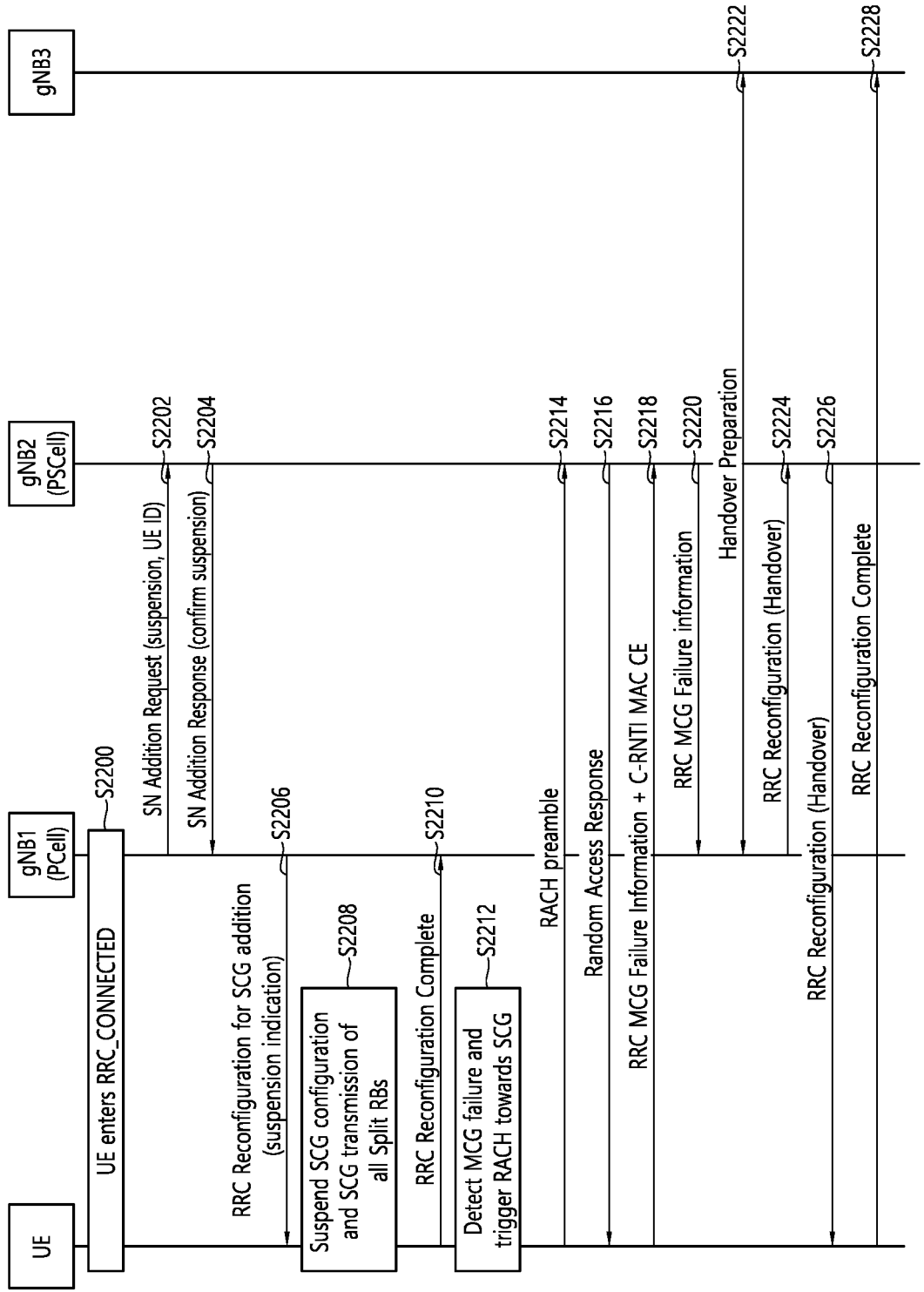
FIG. 22 shows an example of a recovery from RRC connection failure via SCG to which implementations of the present disclosure is applied.

FIG. 22 shows an example of a recovery from RRC connection failure via SCG to which implementations of the present disclosure is applied.

In step S2200, the UE establishes a connection with network (e.g., gNB1). The UE may perform initial access towards the cell (e.g., PCell). The UE and the cell may perform RACH procedure. The UE may establish and/or resume a connection with the gNB1 and enters RRC_CONNECTED. The UE may perform AS security activation upon receiving security mode command from the gNB1. The UE may configure radio bearers and radio configuration upon receiving RRC reconfiguration or resumes radio bearers and radio configuration upon receiving RRC resume. The UE may be configured with MCG, including the PCell.

In step S2202, the gNB1 requests dual connectivity with suspension to the gNB2 by transmitting a SN Addition Request message. The SN Addition Request message may include information on suspension in dual connectivity and/or UE ID.

In step S2204, the gNB2 sends confirmation of suspension in dual connectivity to the gNB1, by transmitting a SN Addition response/acknowledge message.

Therefore, the gNB1 may become a MN which controls the MCG (including PCell) in dual connectivity. The gNB2 may become a SN which controls the SCG (including PSCell) in dual connectivity.

In step S2206, the UE configured with MCG receives configuration of SCG with suspension indication from the gNB1.

In some implementations, the MCG may consist of at least one PCell and zero, one or more SCells as MCG cell(s). The SCG may consist of at least one PSCell and zero, one or more SCells as SCG cell(s).

In step S2208, upon receiving the configuration of SCG with the suspension indication, the UE suspends the configuration of SCG and RACH procedure towards the SCG based on the suspension indication.

In some implementations, if the configuration of SCG includes configuration of one or more split radio bearers, the UE may suspend SCG transmission of all split radio bearers and all SCG radio bearers.

In some implementations, instead of delaying applying the configuration of SCG based on the suspension indication, the UE may trigger RACH procedure and may apply the configuration of SCG in which the SCG cell(s) is configured to be in deactivated and/or dormant state. When the SCG cell(s) is in dormant state, the UE may not need to receive the corresponding PDCCH and/or PDSCH, cannot transmit in the corresponding uplink, but is required to perform CQI measurements. A PUCCH SCell cannot be in dormant state.

In step S2210, the UE transmits a RRC Reconfiguration Complete message to the gNB1.

In step S2212, the UE monitors MCG cell quality (e.g., PCell quality) and detects MCG failure.

In some implementations, the MCG failure may occur in one of the following cases.
  Radio link failure (RLF) in MCG
  RACH failure in MCG
  RLC failure in MCG
  Integrity protection check failure
  Reconfiguration failure
  Handover failure In some implementations, upon detecting the MCG failure, if the configuration of SCG has been suspended, the UE may activate the SCG cell(s). Namely, upon detecting the MCG failure, the UE may resume the configuration in which the SCG cell(s) is configured to be in activated state and trigger a RACH procedure on the SCG cell.

In some implementations, upon detecting the MCG failure, if the SCG cell(s) has been configured to be in deactivated and/or dormant state, the UE may autonomously activate the SCG cell(s) and trigger a RACH procedure on the SCG cell.

In some implementations, the SCG cell may be the PSCell.

In some implementations, upon detecting the MCG failure, the UE may construct RRC MCG failure information message. The RRC MCG failure information message may include information on a type of MCG failure. The RRC MCG failure information message may include measurement results on serving and/or neighbouring cells. The RRC MCG failure information message may also include UE ID.

In step S2214, the UE transmits a RACH preamble of the RACH procedure to the gNB2 controlling the SCG.

In step S2216, the UE receives a random access response of the RACH procedure from the gNB2 in response to the RACH preamble.

In step S2218, the UE indicates detection of the MCG failure to the gNB2 via MSG3 (Message 3) of the RACH procedure. The MSG3 may carry a MAC PDU carrying the RRC MCG failure information message and/or a C-RNTI MAC control element (CE) indicating UE's C-RNTI.

In some implementations, the indication may be carried over SCG transmission of a MCG split SRB and/or SCG SRB (e.g., SRB3).

In some implementations, upon receiving the indication from the UE, the gNB2 may check UE ID such as UE's C-RNTI by which the gNB2 understands that MCG failure information message was received from the UE.

In step S2220, the gNB2 carries/forwards the indication received from the UE to the gNB1 controlling the MCG.

In step S2222, the gNB1 may make decision on handover. Thus, the gNB1 may trigger handover procedure by making handover preparation with the other gNB (e.g., gNB3).

In step S2224, the gNB1 may send a handover command to the gNB2.

In step S2226, the gNB2 may forward the handover command received from the gNB1 to the UE via SCG transmission of the split SRB1, so that UE may reconfigure the MCG.

In step S2228, the UE transmits a RRC Reconfiguration Complete message to the gNB3 to complete handover.

The present disclosure can have various advantageous effects.

For example, a UE can perform fast recovery from RRC connection failure by using suspended SCG link, in particular when the UE does not need SCG resources for user data and/or when the UE does not support full DC capability such as 2TX RF.

For example, the system can provide fast recovery from RRC connection failure for a UE suspending SCG link.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device adapted to operate in a wireless communication system, the method comprising:
  receiving, from a network, a configuration of a secondary cell group (SCG),
    wherein the wireless device is configured with a master cell group (MCG) and the SCG in dual connectivity,
    wherein the MCG comprises a primary cell (PCell) and optionally one or more secondary cells (SCells),
    wherein the SCG comprises a primary SCell (PSCell) and optionally one or more SCells,
    wherein the configuration of the SCG includes a suspension indication;
  based on the suspension indication, storing the configuration of the SCG but delaying activation of the SCG;
  upon detecting a failure on the MCG, based on the activation of the SCG having been delayed:

(i) activating the SCG based on the configuration of the SCG; and
(ii) performing a random access procedure on a cell of the SCG,
wherein the random access procedure includes informing information related to detection of the failure on the MCG, and
wherein the information related to detection of the failure on the MCG is carried from a secondary node (SN) controlling the SCG to a master node (MN) controlling the MCG.

2. The method of claim 1, wherein delaying the activation of the SCG comprises suspending the configuration of the SCG.

3. The method of claim 2, wherein the configuration of the SCG includes a configuration of one or more split radio bearers (RBs), and
wherein a transmission of the one or more split RBs related to the SCG is suspended.

4. The method of claim 1, wherein delaying the activation of the SCG comprises applying the configuration in which the cell of the SCG is configured to be in a deactivated state and/or a dormant state.

5. The method of claim 1, wherein activating the SCG based on the configuration comprises applying the configuration in which the cell of the SCG is configured to be in an activated state.

6. The method of claim 1, wherein the cell of the SCG is the PSCell.

7. The method of claim 1, wherein the information related to detection of the failure on the MCG is indicated via a message 3 of the random access procedure.

8. The method of claim 1, wherein the information related to detection of the failure on the MCG is indicated over a SCG transmission of a MCG split signaling radio bearer (SRB) and/or a SCG SRB.

9. The method of claim 1, wherein the wireless device is in communication with at least one of a mobile device, a network, and/or autonomous vehicles other than the wireless device.

10. A wireless device adapted to operate in a wireless communication system, the wireless device comprising:
at least one transceiver;
at least one processor; and
at least one computer memory operably connectable to the at least one processor and storing instructions that, based on being executed by the at least one processor, perform operations comprising:
receiving, from a network, a configuration of a secondary cell group (SCG),
wherein the wireless device is configured with a master cell group (MCG) and the SCG in dual connectivity,
wherein the MCG comprises a primary cell (PCell) and optionally one or more secondary cells (SCells),
wherein the SCG comprises a primary SCell (PSCell) and optionally one or more SCells,
wherein the configuration of the SCG includes a suspension indication;
based on the suspension indication, storing the configuration of the SCG but delaying activation of the SCG;
upon detecting a failure on the MCG, based on the activation of the SCG having been delayed:
(i) activating the SCG based on the configuration of the SCG; and
(ii) performing a random access procedure on a cell of the SCG,
wherein the random access procedure includes informing information related to detection of the failure on the MCG, and
wherein the information related to detection of the failure on the MCG is carried from a secondary node (SN) controlling the SCG to a master node (MN) controlling the MCG.

11. The wireless device of claim 10, wherein delaying the activation of the SCG comprises suspending the configuration of the SCG.

12. The wireless device of claim 10, wherein delaying the activation of the SCG comprises applying the configuration in which the cell of the SCG is configured to be in a deactivated state and/or a dormant state.

13. A processing apparatus adapted to control a wireless device in a wireless communication system, the processing apparatus comprising:
at least one memory;
at least processor, operably coupled to the at least one memory,
wherein the at least one processor is configured to:
obtain a configuration of a secondary cell group (SCG),
wherein the wireless device is configured with a master cell group (MCG) and the SCG in dual connectivity,
wherein the MCG comprises a primary cell (PCell) and optionally one or more secondary cells (SCells),
wherein the SCG comprises a primary SCell (PSCell) and optionally one or more SCells,
wherein the configuration of the SCG includes a suspension indication;
based on the suspension indication, store the configuration of the SCG but delay activation of the SCG;
upon detecting a failure on the MCG, based on the activation of the SCG having been delayed:
activate the SCG based on the configuration of the SCG; and
perform a random access procedure on a cell of the SCG,
wherein the random access procedure includes informing information related to detection of the failure on the MCG, and
wherein the information related to detection of the failure on the MCG is carried from a secondary node (SN) controlling the SCG to a master node (MN) controlling the MCG.

* * * * *